(12) United States Patent
Campau (10) Patent No.: US 8,899,896 B1
(45) Date of Patent: Dec. 2, 2014

(54) NUT LOCK

(71) Applicant: Flow-Rite Controls, Ltd., Byron Center, MI (US)

(72) Inventor: Daniel N. Campau, Ada, MI (US)

(73) Assignee: Lockon LLC, Byron Center, MI (US)

( * ) Notice: Subject to any disclaimer, the term of this patent is extended or adjusted under 35 U.S.C. 154(b) by 0 days.

(21) Appl. No.: 13/907,408

(22) Filed: May 31, 2013

(51) Int. Cl.
*F16B 37/12* (2006.01)

(52) U.S. Cl.
USPC ..................... 411/251; 411/248; 411/929.1

(58) Field of Classification Search
USPC ......... 411/204, 246, 248, 250, 251, 262, 918, 411/929, 929.1, 941.1, 946
See application file for complete search history.

(56) References Cited

U.S. PATENT DOCUMENTS

| | | | |
|---|---|---|---|
| 637,360 A | 11/1899 | Stark | |
| 1,172,722 A | 2/1916 | Millard | |
| 1,502,555 A * | 7/1924 | Eklund | 411/262 |
| 1,630,958 A * | 5/1927 | Mauch | 411/252 |
| 1,830,919 A | 11/1931 | Sundh | |
| 2,324,731 A * | 7/1943 | Simmonds | 411/312 |
| 2,497,081 A * | 2/1950 | Hattan | 411/262 |
| 2,515,220 A * | 7/1950 | Hattan | 411/262 |
| 2,587,560 A * | 2/1952 | Widmer | 411/231 |
| 3,589,423 A * | 6/1971 | Metz | 411/262 |
| 4,040,462 A * | 8/1977 | Hattan | 411/277 |
| 5,449,259 A * | 9/1995 | Clohessey | 411/262 |
| 8,021,093 B2 * | 9/2011 | Campau | 411/252 |
| 8,425,168 B2 * | 4/2013 | Campau | 411/251 |
| 8,439,616 B2 * | 5/2013 | Campau | 411/251 |
| 8,734,072 B2 * | 5/2014 | Campau | 411/252 |
| 2011/0176887 A1 * | 7/2011 | Im | 411/262 |
| 2012/0301246 A1 * | 11/2012 | Campau | 411/252 |
| 2012/0301247 A1 * | 11/2012 | Campau | 411/262 |

FOREIGN PATENT DOCUMENTS

FR 582530 12/1924

OTHER PUBLICATIONS

International Search Report and Written Opinion from PCT/US2014/032442 dated Aug. 18, 2014.

* cited by examiner

*Primary Examiner* — Roberta Delisle
(74) *Attorney, Agent, or Firm* — Warner Norcross & Judd LLP (57) ABSTRACT

A nut lock includes a nut body, a locking coil, and a cage. The locking coil includes first and second tangs and has an internal diameter that is smaller than the internal diameter of the nut body. The cage is fixed within the nut body and includes a circumferential wall defining first and second stops. The locking coil is located within the cage, and the first and second tangs are positioned proximate the first and second stops of the cage. The first tang engages the first stop when the nut lock is turned in a first direction, and the second tang engages the second stop when the nut lock is turned in a second direction.

15 Claims, 9 Drawing Sheets

NUT LOCK

BACKGROUND OF THE INVENTION

The present invention relates to nut locks, and more particularly to nut locks that includes a locking coil.

When nut and bolt assemblies require high strength and high resistance to loosening, prevailing torque locknuts are not generally used. More positive mechanical locking means are preferred. There are a number of methods used including adhesives, serrated hex-flange nuts, jam nuts, cotter pins, lock wiring, welding, locking pins or locking rings with keyways, and various added mechanical components that capture nuts or bolt heads and lock them in position by connecting to adjacent structure. In cases where adjacent structure is used, constraints must be added to both nut and bolt head to prevent relative rotation. The noted locking means all have limitations.

Adhesives require proper surface preparation and may not be appropriate where service requires removal.

Serrated hex-flange nuts are effective for joints with materials having hardness less than 40 RC. For nut and bolt assemblies, both the bolt and the nut must use serrated flanges. The serrations can damage painted and coated surfaces and lead to corrosion.

A jam nut is a second threaded nut, usually thinner, which is tightened against the main load-bearing nut. The use of jam nuts is controversial and is not recommended by the Industrial Fastener Institute, because load-sharing between the two nuts is difficult to control and can lead to loosening or failure of the jam nut threads.

Special jam nut designs marketed under the Hard Lock trademark include a threaded main nut that has an eccentric convex conical backside that mates with a threaded jam nut that has a centered concave conical mating surface. While this design is claimed to function effectively, it is relatively complex and requires training to use properly. A significant limitation is that it must be integral with the nuts so it cannot be used with standard nuts.

Cotter pins and lock wires can positively retain nuts, but they do not maintain bolt tension.

Nuts and bolts can be welded together or to adjoining structure. This can be effective, but must be done only by skilled and trained operators and only where a permanent joint is acceptable.

Specialized fasteners sold under the Huck Lockbolt, Truelock Bolt, and Axilok Nuts use locking rings and keyways to mechanically lock nuts and bolts. These are complex mechanical systems that cannot be used with standard nuts and bolts.

Other specialized mechanical locking systems are used such as the Nordlock ramped washer system and the Stage 8 system. Both of these anchor either the bolt head or the nut to adjacent structure and prevent rotation of the anchored component. Two sets must be used if relative rotation between the nut and bolt is required. This adds expense and complexity. The Nordlock system requires a limit to the hardness of the adjacent structure so that the serrated washer can embed and grip to prevent rotation. This can damage softer materials, as well as painted or coated surfaces. The Stage 8 system requires sets of various hardware components to prevent the counterclockwise rotation of bolt heads or nuts by anchoring them to adjacent structure.

SUMMARY OF THE INVENTION

Nut locks disclosed herein prevent loosening of nuts, especially in severe service conditions. Nut locks eliminate the complexity and limitation of these systems and provide the performance needed in the most demanding applications. A nut lock is used with standard nuts and bolts. In size, it meets the industry standard for jam nut dimensions. In use, it is much simpler to use than any of the other positive locking systems. Only one nut lock is needed to prevent both the nut and the bolt from rotation relative to each other. The present invention provides a nut lock of improved performance and wider applicability.

As disclosed, the nut lock includes a body, a locking coil, and a cage. The locking coil is located within the cage, and the cage is secured within the body. The cage includes first and second stops, and the locking coil includes first and second tangs proximate the first and second stops. The tangs are positioned to engage the stops when the nut body is rotated, so that the coil is loosened when the fastener body is turned in a first direction and tightened with the fastener body is turned in a second direction. The interior diameter of the locking coil is smaller than the interior diameter of the body so that only the locking coil engages a threaded member when the nut lock is mounted on a threaded member.

These and other advantages and features of the invention will be more fully understood and appreciated by reference to the description of the current embodiments and the drawings.

DESCRIPTION OF THE CURRENT EMBODIMENT

Before the current embodiment of the invention is described, it is pointed out that the invention is not limited to the details of operation, the details of construction, or the arrangement of the components set forth in the following description or illustrated in the drawings. The invention may be implemented in various other embodiments and may be practiced or carried out in alternative ways not expressly disclosed herein. Also, it is pointed out that the terminology used herein is for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

A nut lock constructed in accordance with one embodiment of the invention is illustrated in FIGS. 1-6 and generally designated 40. Although shown in FIGS. 1-6 as a nut lock or a jam nut, the concepts of the present invention can be incorporated into a variety of nuts and fasteners as will be recognized by those skilled in the art.

Figure 1:
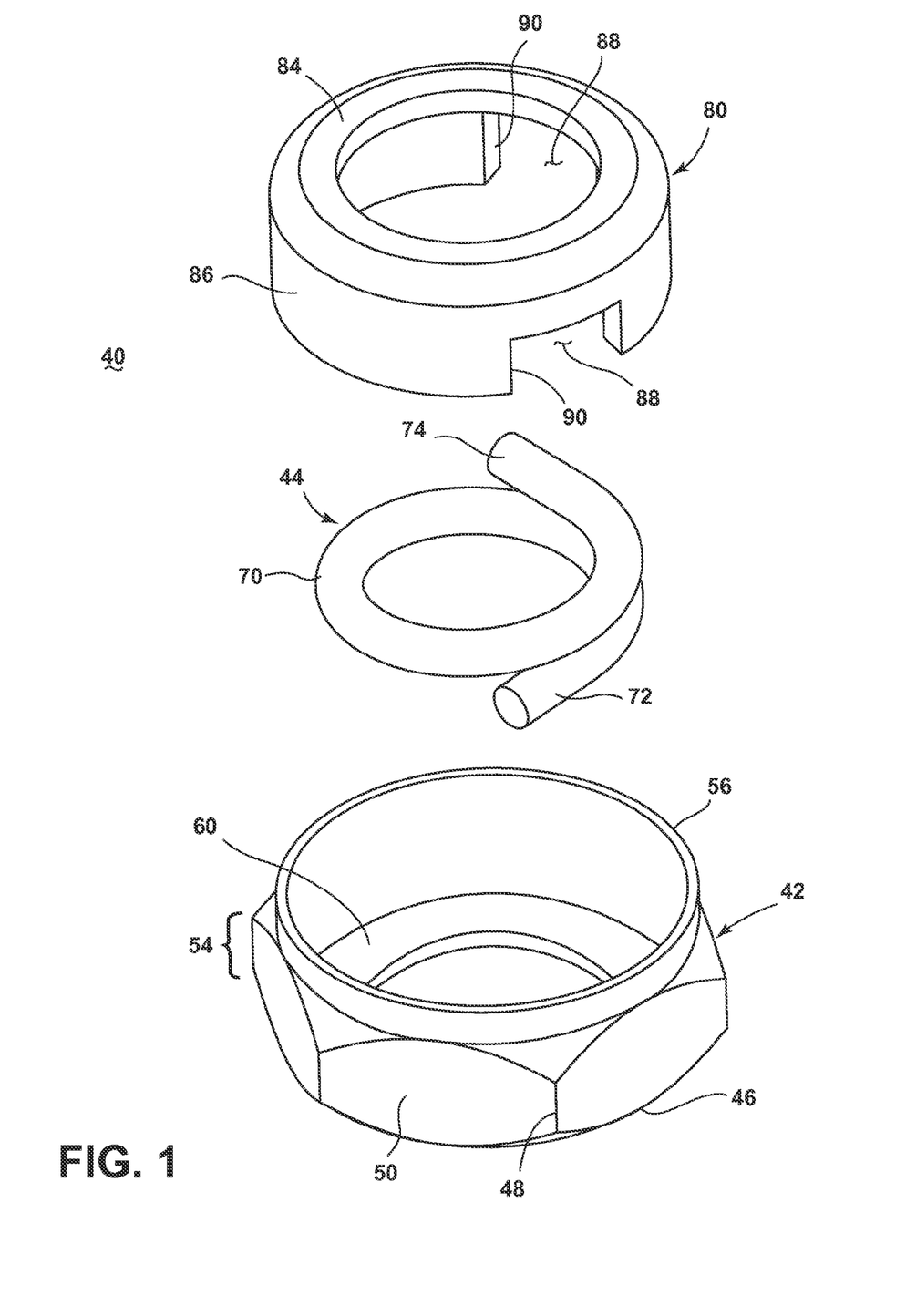
FIG. 1 is a perspective, exploded view of a first embodiment of the nut lock.

The nut lock 40 includes a nut body 42 and a locking element, spring, coil, or band 44. The nut body 42 includes a hex-shaped outer portion 46 configured to be engaged and driven by a conventional driving tool (not shown). The hex-shaped portion 46 includes a plurality of corners 48 and a plurality of flats 50 extending therebetween. Alternatively, the nut body 42 may be square, otherwise polygonal, or any other shape. The nut body 42 may also be shaped to be engaged by any conventional driving tool, now known or later developed.

The nut body 42 includes a main body portion 54 and a collar 56 extending from the main body portion 54 and defining a counterbore, recess, or pocket. A shoulder 60 separates the main body portion 54 and the collar 56. No portion of the nut body 42 is threaded.

The locking band 44 includes a coil or continuously curved portion 70 having a circular cross-section extending between a first tang or end portion 72 and a second tang or end portion 74. Though illustrated with a circular cross-section, other cross-sectional shapes are contemplated including square, rectangular, ovate, triangular, and any other suitable shape.

In this embodiment, the first and second tangs or end portions 72, 74 are straight, but other shapes, including smooth curves and angles, are also contemplated. Both tangs 72, 74 extend tangentially outward from the curved portion 70. Also, the locking band 44 may include a single turn, with the first tang 72 overlapping the second tang 74. The locking band 44 may alternatively include less than a single turn, or greater than one turn so that adjacent turns are substantially in contact with each other. In the illustrated example, the locking band 44 has just more than one full turn. In this configuration, the first and second tangs 72, 74 do not lay one atop the other, they are radially separated and the curved portion 70 is stacked or layered in the portion between the first and second tangs 72, 74. As shown in FIG. 1, the locking band 44 may be symmetrical to simplify manufacturing.

Figure 2:
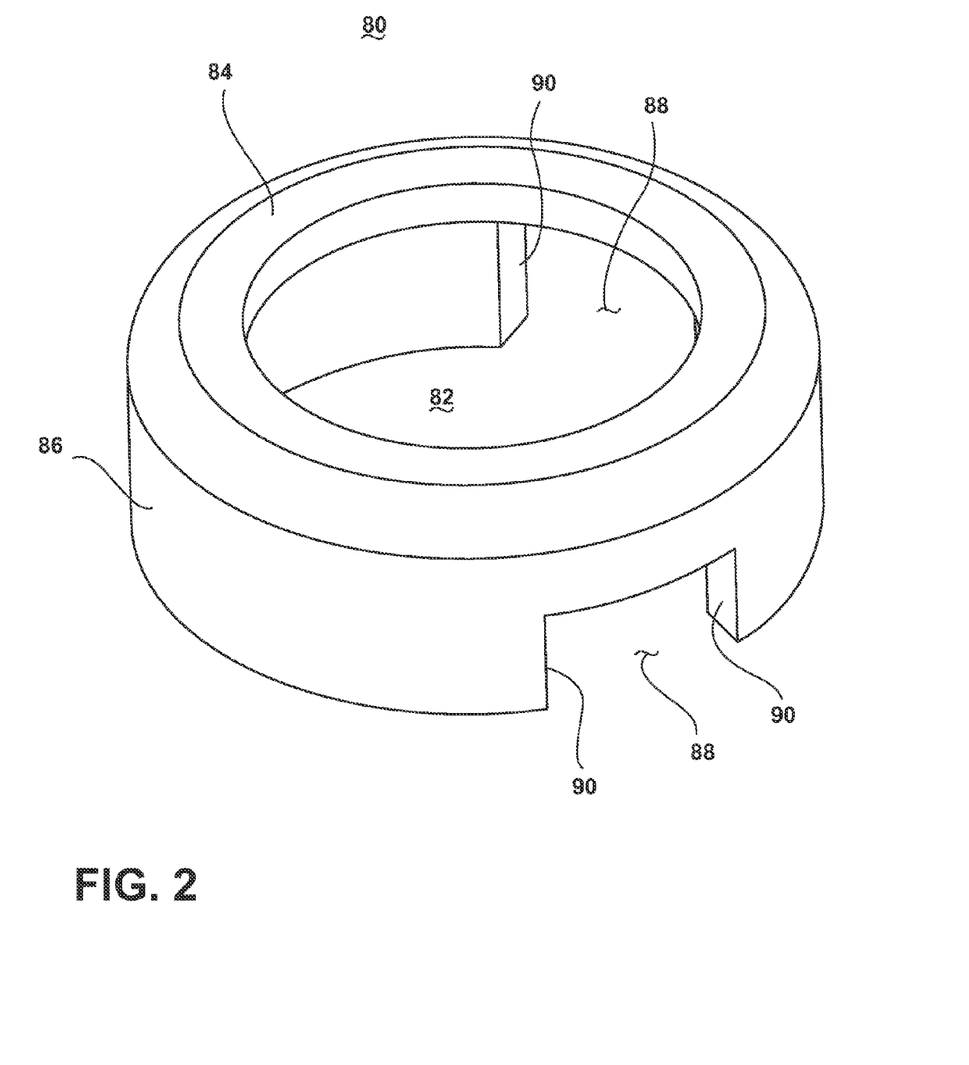
FIG. 2 is a top perspective view of the cage of the nut lock.
Figure 3:
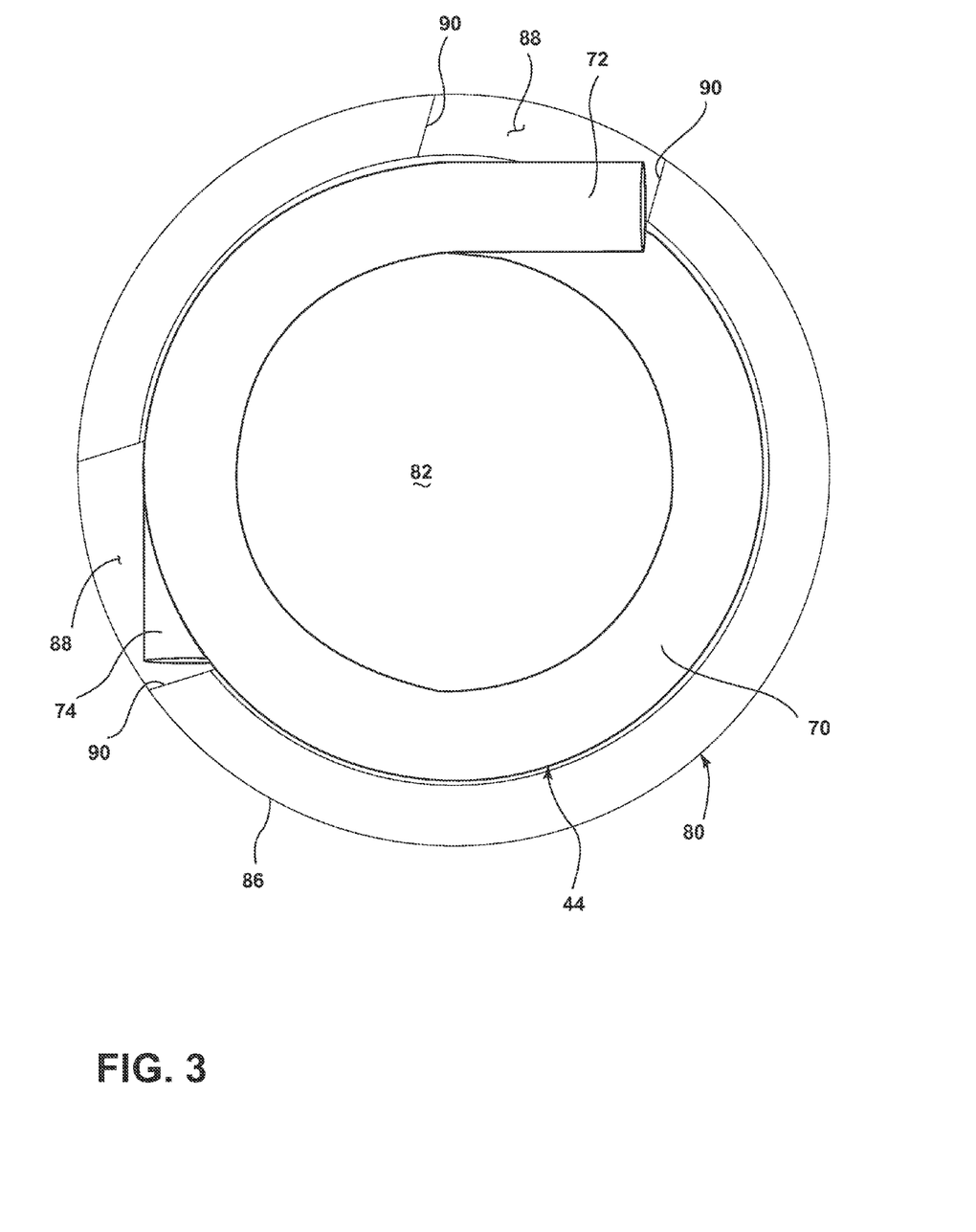
FIG. 3 is bottom view of the locking band and the cage of the nut lock.
Figure 4:
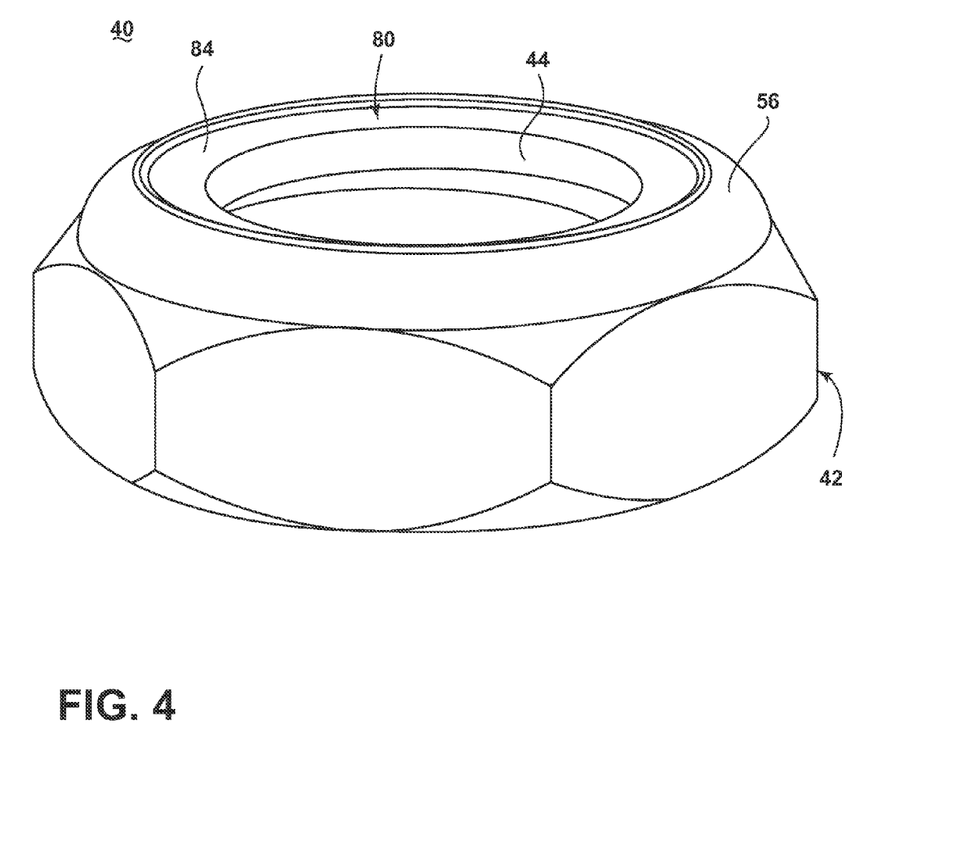
FIG. 4 is a perspective view of the nut lock.

Referring now to FIGS. 1-3, the nut lock 40 also includes a spring retainer or cage 80. The cage 80 is a generally cup-shaped member having a central opening 82 defining a rim 84 on an upper surface of the cage 80. The cage 80 further includes a circumferential wall or downwardly depending skirt 86 that includes a plurality of slots 88 formed therein. In this embodiment, the cage 80 includes two spaced slots 88. Further, each slot 88 includes two side edges or stops 90.

The cage 80 may be manufactured of a flat metal that is formed in a progressive stamping operation, or any other suitable material or forming operation. While this embodiment includes two slots 88, more or fewer slots 88 are contemplated.

Referring to FIG. 3, the locking band 44 is disposed within the cage 80 and is oriented such that the end of the first tang 72 is positioned within the first slot 88 and the end of the second tang 74 is positioned within the second slot 88. As seen in FIG. 3, angular movement of the first and second tangs 72, 74 is therefore constrained by the side edges 90 of the slots 88. For example, during rotation of the nut lock 40 in an installation or clockwise direction, the end of the second tang 74 may contact side edge 90 of the second slot 88, and in a removal or counterclockwise direction, the end of the first tang 72 may contact side edge 90 of the first slot 88. Accordingly, the angular movement of the first and second tangs 72, 74 is limited relative to the nut body 42. The curved portion 70 of the locking band 44 is supported upon the interior surface of the rim 84.

To retain the cage 80 and locking band 44 within the nut body 42 and to maintain alignment of the components, the collar 56 of the nut body 42 may be controllably deformed over the cage 80. It is contemplated that manufacturing methods such as swaging, crimping, or orbital forming may be utilized. Of course, any other suitable means for bending the collar 56 over the cage 80 may also be used.

Figure 6:
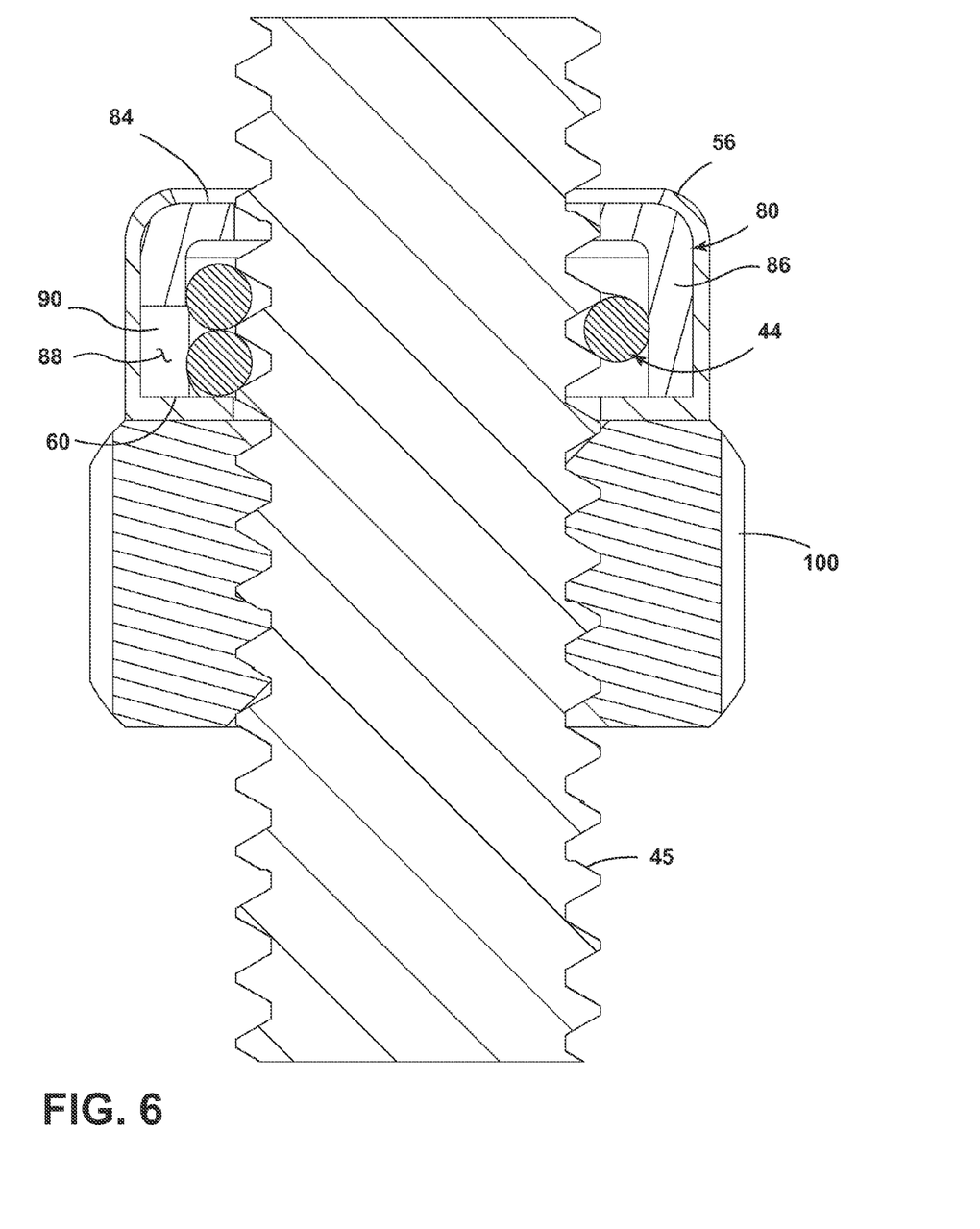
FIG. 6 is a cross-sectional view of the nut lock, primary nut, and externally threaded member, taken along line V-V of FIG. 5.

Both the cage 80 and the locking band 44 may be sized to fit the desired nut body 42 and the externally threaded member 45. As seen in FIG. 6, the outside diameter of the cage 80 may be sized to closely fit within the internal diameter of the collar 56, and the central opening 82 may be sized to match or provide clearance to the externally threaded member 45. The diameter of the locking band 44 may be sized to fit within the cage 80, but includes sufficient clearance to enable the locking band 44 to expand slightly when the nut lock 40 is mounted to the threaded member 45. The diameter of the circular cross-section of the locking band 44 generally corresponds to the pitch of the threaded member 45, so that the locking band 44 fits within the threads of the threaded member 45. In a locking band with a non-circular cross-section, the dimension of the surface engaging the threads of the threaded member 45 may be less than, generally the same as, or greater than the pitch of the threaded member.

The internal diameter of the locking band 44 is smaller than the internal diameter of the nut body 42. Consequently, only the locking band engages the threaded member 45, and the nut body 42 "just goes along for the ride" as the locking band rides within the threads of the member 45.

The nut body 42, locking band 44, and cage 80 may be manufactured from any suitable materials, including metals and composites. Additionally, the locking band 44 may be manufactured from relatively low-cost materials such as round steel wire.

To install the nut lock 40 onto the externally threaded member 45, the nut body 42 is rotated in a first or generally clockwise direction. Rotating the nut body 42 in the clockwise direction forces the end of the second tang 74 into contact with the side edge 90 of the second slot 88. This contact force slightly expands the locking band 44 and reduces or potentially eliminates friction between the locking element 44 and the threaded member 45 such that the locking band 44 does not inhibit installation of the nut lock 40 onto the threaded member 45.

Conversely, to remove the nut lock 40, the nut body 42 is rotated in a second or generally counterclockwise direction. Rotating the nut body 42 in the counterclockwise direction forces the end of the first tang 72 into contact with the side edge 90 of the first slot 88. As with installation, this contact force slightly expands the locking band 44 and reduces or eliminates friction between the locking element 44 and the threaded member 45, allowing removal of the nut lock 40 from the threaded member 45.

Figure 5:
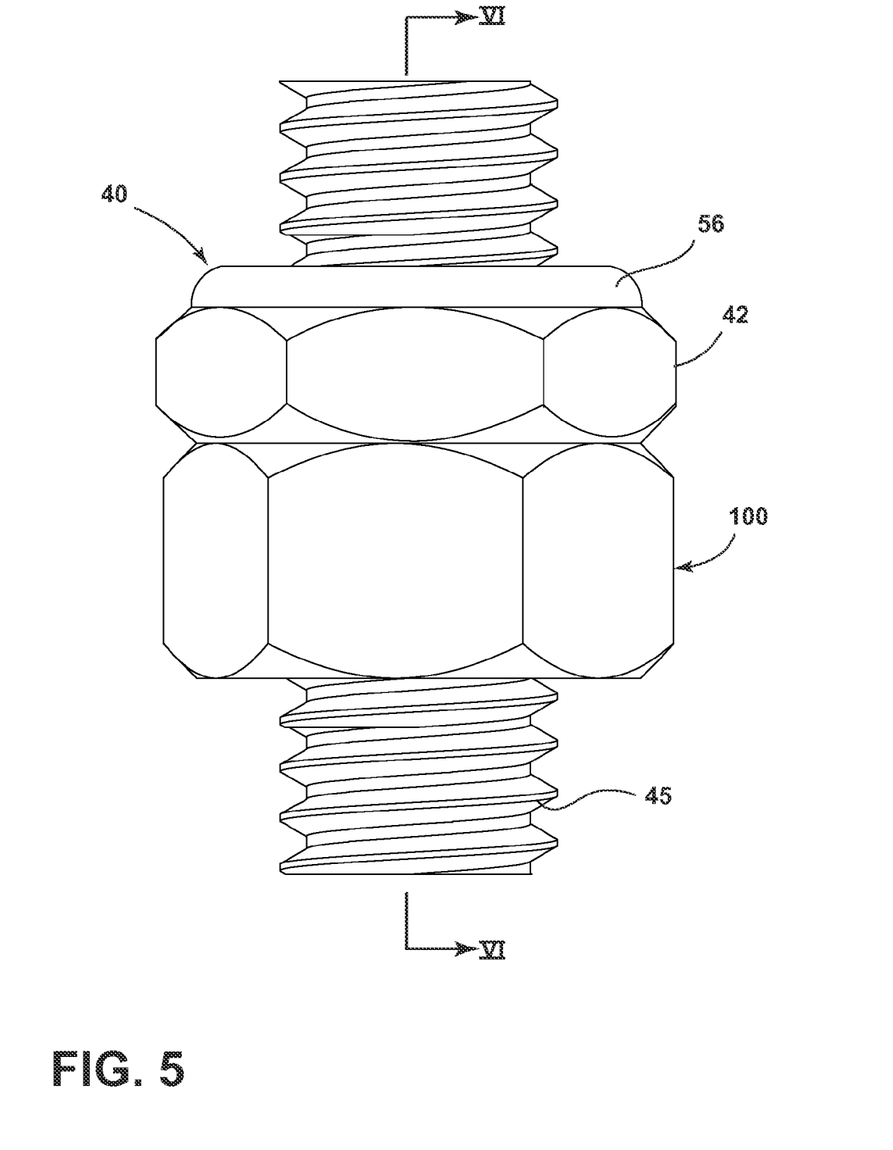
FIG. 5 is a side view of the nut lock, mounted on a threaded member and adjacent to a primary nut.

Referring to FIG. 5, an application of the nut lock 40 is shown where the nut lock 40 is utilized in conjunction with a threaded primary nut 100 and the externally threaded member 45, illustrated as a standard bolt. In this application, the primary nut 100 is threaded onto the bolt 45 as is conventional. Installation of the nut lock 40 requires that there be a sufficient length of the bolt 45 extending above the primary nut 100 for the nut lock 40 to be installed. The nut lock 40 is threaded onto the bolt 45 and tightened against the primary nut 100 to a torque of about 10%, for example, of the main nut torque. Due to the locking band 44, the nut lock 40 is self-locking, thereby positively preventing the primary nut 100 from rotating loose relative to the bolt 45, even under severe vibration.

Figure 7:
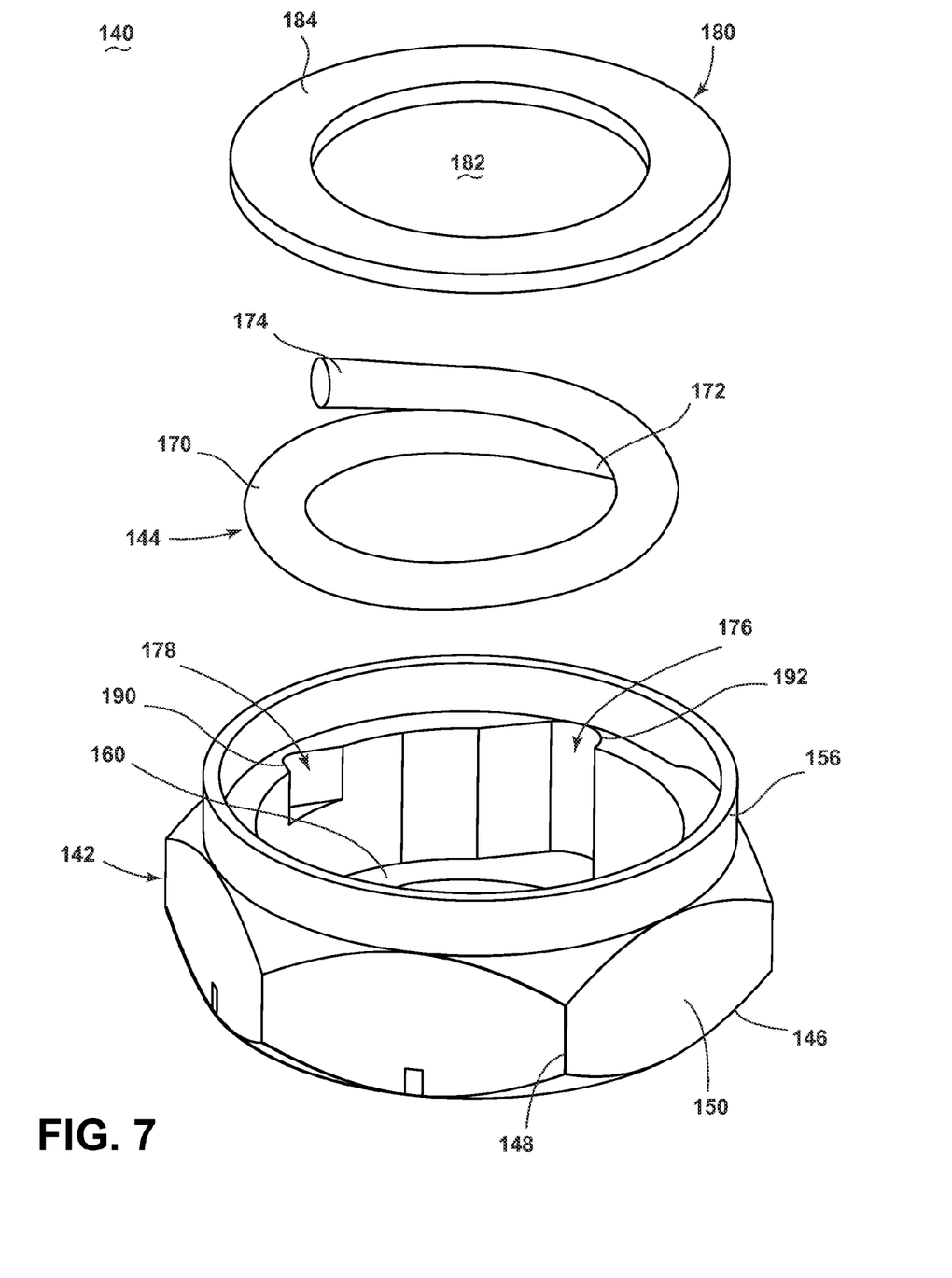
FIG. 7 is a perspective, exploded view of a second embodiment of the nut lock.
Figure 8:
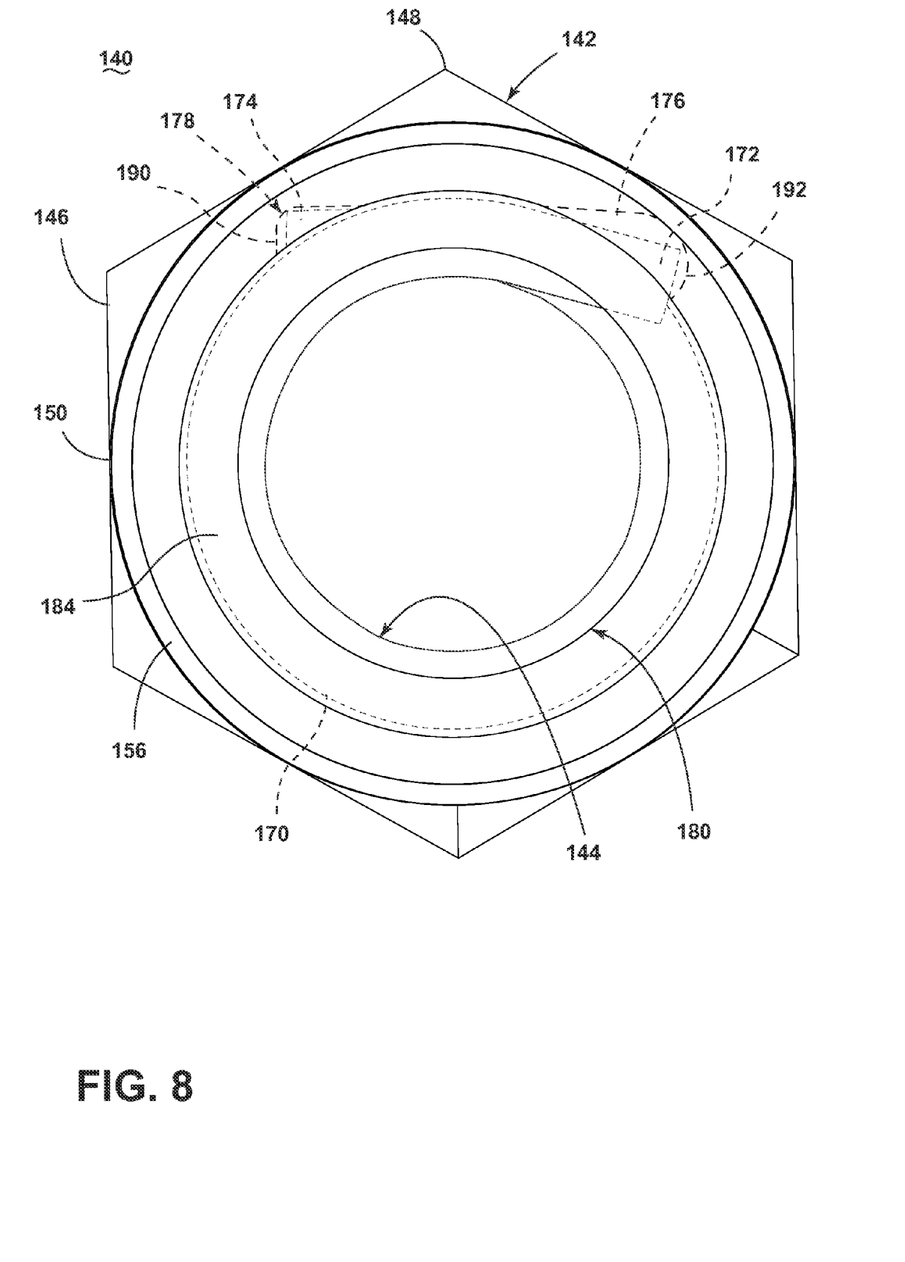
FIG. 8 is a top view of the nut lock of FIG. 7.
Figure 9:
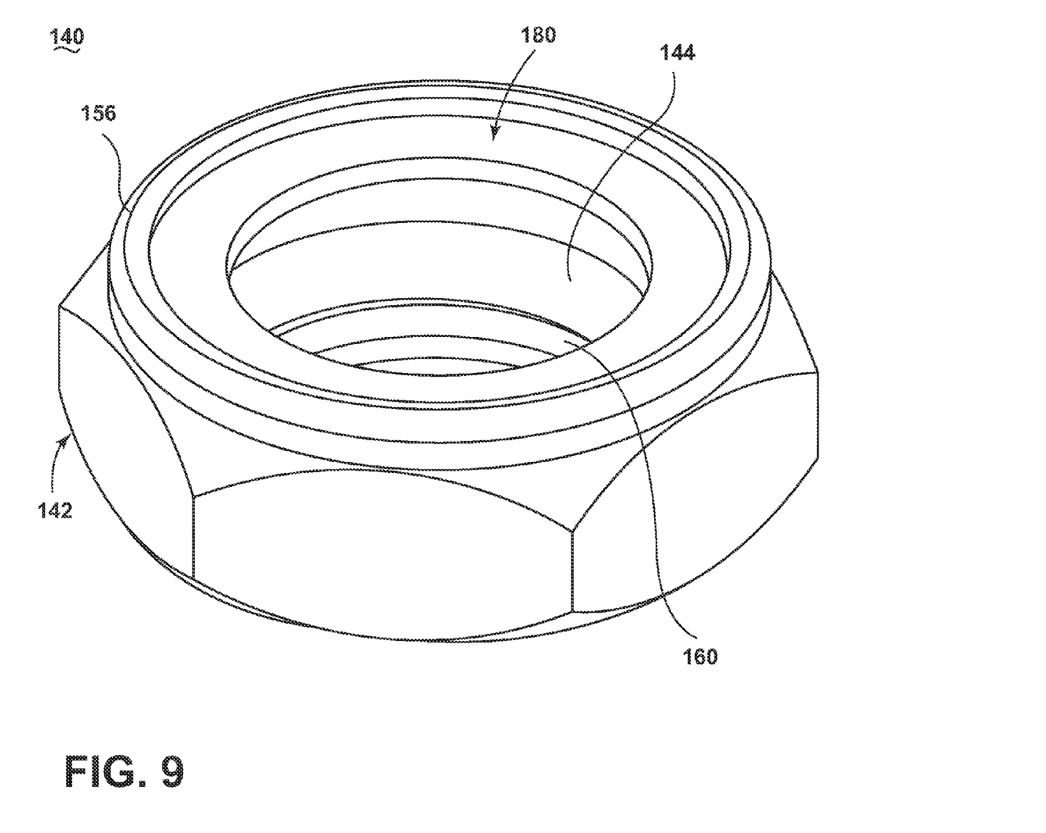
FIG. 9 is a top, perspective view of the nut lock of FIG. 7.

A nut lock constructed in accordance with a second embodiment of the invention is illustrated in FIGS. 7-9 and generally designated 140. The nut lock 140 is structurally and functionally similar to the previously described nut lock 40. Consequently, each element of the nut lock 140 is identified by the same designating numeral as the corresponding element in the nut lock 40 with the exception that the numeral is increased by 100. For example, the locking band 144 in the nut lock 140 corresponds to the locking band 44 in the nut lock 40. Only the elements that differ significantly are described below.

The nut lock 140 eliminates the cage 80 of the first embodiment, and employs a washer 180 in its place. The washer 180 is a simple washer and has a surface 184 and a central opening 182 therethrough. Additionally, the body 142 defines a first recess 176 and a second recess 178 formed on an interior of the nut body 142. Similar to the first embodiment, the washer 180 and locking band 144 are retained within the nut body 142 by controllably deforming the collar 156 over the washer 180.

The second tang 174 is received and constrained within the second recess 178 in the nut body 42. As shown in FIG. 7, the second recess 178 has an end wall 190 that engages an end of the second tang 174 during rotation of the nut body 142. Optionally, the second recess 178 may be configured to engage a corner or any other suitable surface of the second tang 174 during rotation of the nut body 142. Consequently, rotating the nut body 142 in the clockwise direction forces the end of the second tang 174 into contact with the end wall 190 of the second recess 178, enabling installation of the nut lock 140.

The first tang 172 of the locking band 144 extends into the first recess 176. The first tang 172 is normally free to rotate angularly relative to the body 42 within the second recess 64. The first recess 176 has an end wall 192 that engages an end of the first tang 172 during removal or counterclockwise rotation of the nut body 142. Therefore, rotating the nut body 142 in the counterclockwise direction forces the end of the first tang 172 into contact with the end wall 192 of the first recess 176, enabling removal of the nut lock 140.

Although illustrated as two recesses 176, 178 the body 142 may instead define a combination of recesses and/or surfaces to receive each of the tangs 172, 174.

Additionally, it is contemplated that the nut locks 40 and 140 may be used without the primary nut 100 in applications where torsional joint friction is required, but high joint compression is not required. Examples of such applications include battery cables and ground wires that are attached to threaded posts to maintain secure electrical connections with no risk of vibrating loose. Another application may be a mechanical apparatus where two members are bolted together in a hinged relationship. Utilizing the nut locks 40 and 140 enables the members to be mounted together with controlled friction that does not change with the relative motion between the members. Despite the rotation in the joint, the nut locks 40 and 140 will not loosen or tighten, thereby maintaining the preset torsional friction in the hinge.

The nut locks provide a versatile and simple alternative to traditional nut locks, many of which use secondary members or operations such as adhesive, cotter pins, welding, and locking pins or rings. The present nut lock may be used with standard nuts and bolts, is simpler to use than traditional nut locks, can be reused multiple times without loss of effectiveness, may be scaled to meet specific needs, and does not damage the bolt threads. Further, the nut lock doesn't change the way the primary nut and bolt are installed. Consequently, the new nut lock provides an improved balance of simplicity and performance.

The above descriptions are current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

Directional terms, such as "vertical," "horizontal," "top," "bottom," "upper," "lower," "inner," "inwardly," "outer," "outwardly," "clockwise," and "counterclockwise" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular unless expressly stated in the issued claims.

The invention claimed is:

1. A nut lock comprising:
   an unthreaded nut body having a main body portion and a collar extending therefrom to define a pocket, the nut body having an outer portion configured to be engaged and driven by a conventional driving tool;
   a locking band within the pocket of the nut body, the locking band including a coil portion and first and second tangs extending from the coil portion; and
   a cage having a rim and a skirt, the cage located within the pocket of the nut body, the skirt including first and second slots formed therein, the locking band being within the cage, the first and second tangs extending into the first and second slots respectively, the cage retained within the nut body by the collar.

2. The nut lock of claim 1 wherein the first and second tangs extend generally tangentially from the coil portion.

3. The nut lock of claim 1 wherein the first tang is configured to contact a side edge of the first slot during removal of the nut lock from an externally threaded member.

4. The nut lock of claim 3 wherein the second tang is configured to contact a side edge of the second slot during installation of the nut lock when mounted to an externally threaded member.

5. The nut lock of claim 1 wherein an upper portion of the collar is deformed to retain the cage within the nut body.

6. The nut lock of claim 1 wherein the rim defines an aperture having a diameter corresponding to the interior diameter of the locking band.

7. A nut lock for locking a threaded primary nut to an externally threaded member comprising:
- an unthreaded nut body having a main body portion and a collar extending therefrom to define a pocket, the nut body having an outer portion configured to be engaged and driven by a conventional driving tool;
- a locking band within the pocket of the nut body, the locking band including a coil portion and first and second tangs extending from the coil portion; and
- a cage having a rim and a skirt, the cage located within the pocket of the nut body, the skirt including first and second slots formed therein, the locking band being within the cage, the first and second tangs extending into the first and second slots respectively, the cage retained within the nut body by the collar.

8. The nut lock of claim 7 wherein the first and second tangs extend generally tangentially from the coil portion.

9. The nut lock of claim 7 wherein the first tang is configured to contact a side edge of the first slot during rotation of the nut lock in a first direction.

10. The nut lock of claim 9 wherein the second tang is configured to contact a side edge of the second slot during rotation of the nut lock in a second direction.

11. The nut lock of claim 7 wherein the collar is deformed to retain the cage within the nut body.

12. The nut lock of claim 7 wherein the rim defines a central aperture having a diameter corresponding to the internal diameter of the locking band.

13. A nut lock comprising:
- an unthreaded nut body having an outer portion configured to be engaged and driven by a conventional driving tool, the nut body defining a pocket;
- a cage fixed within the pocket of the nut body, the cage including a circumferential wall defining first and second stops; and
- a locking coil including first and second tangs, the locking coil being within the pocket of the nut body and within the cage, the locking coil having an internal diameter smaller than the internal diameter of the nut body, the first and second tangs being proximate the first and second stops, whereby the first tang engages the first stop when the nut lock is turned in a first direction, and the second tang engages the second stop when the nut lock is turned in a second direction.

14. The nut lock of claim 13 wherein:
- the first and second stops are defined by first and second slots in the circumferential wall; and
- the first and second tangs are located within the first and second slots.

15. The nut lock of claim 13 wherein:
- the nut body includes a shoulder defining the bottom of the pocket and an opposite swaged portion; and
- the cage is fixed between the shoulder and the swaged portion.

* * * * *